United States Patent [19]

Hager et al.

[11] Patent Number: 4,864,805

[45] Date of Patent: Sep. 12, 1989

[54] SYSTEM FOR SUPPORTING A WORKING UNIT

[75] Inventors: Joseph P. Hager, Burnsville; Charles C. Holley, Bloomington, both of Minn.

[73] Assignee: The Toro Company, Minneapolis, Minn.

[21] Appl. No.: 93,350

[22] Filed: Sep. 4, 1987

[51] Int. Cl.[4] .......................................... A01D 34/66
[52] U.S. Cl. .................................................. 56/11.9
[58] Field of Search ................... 56/11.9, 208, DIG. 15

[56] References Cited

U.S. PATENT DOCUMENTS

| | | | |
|---|---|---|---|
| 3,623,301 | 11/1971 | Hofer | 56/11.9 |
| 3,729,910 | 5/1973 | Hardee | 56/11.9 |
| 3,918,240 | 11/1975 | Haffner et al. | 56/11.9 |
| 4,335,561 | 6/1982 | Swanson et al. | 56/11.9 |
| 4,506,414 | 3/1985 | Cartner | 56/11.9 |
| 4,631,907 | 12/1986 | Zipps | 56/11.9 |

Primary Examiner—Paul J. Hirsch
Attorney, Agent, or Firm—R. Lawrence Buckley

[57] ABSTRACT

A hydraulic system (30) suitable for raising, lowering, floating and locking a cutting deck (16). Hydraulic circuit (30) preferably includes a back pressure system (40) for automatically, or manually, applying a preferred back pressure to hydraulic cylinders (24) to "float" decks (16). Connected to back pressure system (40) is an actuation system (42) which can automatically or manually act on back pressure system (40) to change the back pressure depending on conditions. For example, it may be desirable to increase the back pressure when mower (10) encounters a hill to transfer more weight from the cutting unit (16) to the traction vehicle (12) of mower (10).

24 Claims, 3 Drawing Sheets

SYSTEM FOR SUPPORTING A WORKING UNIT

TECHNICAL FIELD

The present invention relates generally to machines which have a traction vehicle and one or more working units cooperatively connected thereto. More particularly, the invention pertains to a system for supporting the working unit(s) of a turf maintenance machine, e.g., a turf mowing machine, such that a preferred weight distribution is established between the traction vehicle and the working unit(s).

BACKGROUND OF THE INVENTION

There are many machines which include a traction vehicle and one or more "working units" attached thereto. For example, crop harvesting machines typically include large wheeled vehicles supporting one or more vegetation cutters. Although the present invention can be applied to a wide variety of machines having traction vehicles and working units, one particularly advantageous application is a turf maintenance machine such as a turf mower having one or more turf cutting units. The cutting units of a turf mowing machine can be of the rotary, reel or flail type. Turf mowers having rotary cutting units or decks are often referred to as rotary mowers since the blades revolve in a rotary fashion within the cutting unit. The present invention will be described in terms of a riding (as opposed to a walk-behind) rotary mower having one or more rotary cutting units or decks, but those skilled in the art will recognize that the invention could be applied to a wide variety of harvesting and turf maintenance machines.

Larger rotary mowers typically include a traction vehicle supported by a plurality of wheels; a prime mover connected through a transmission to one or more of the wheels; one or more decks connected through a power take-off (PTO) to the prime mover; and one or more lift arms (or analogous structures) pivotally connected to the traction vehicle suitable for supporting the deck(s).

Preferred rotary mowers have several features. Certainly, the traction vehicle must indeed provide adequate traction under a wide variety of conditions. The vehicle must be able to climb hills, allow for sidehill cutting, and provide braking even in downhill and/or wet conditions. Further, the vehicle must provide enough traction so that turf mowing can be done quickly and efficiently. If the traction wheels slip when the vehicle encounters a hill, the operator must typically return to the bottom of the hill and reattempt an ascent. Once traction is lost, e.g., on a wet hill, and the drive wheels begin to slip, it is nearly impossible to reestablish traction.

Another important characteristic of rotary mowers is the ability of the decks to "float" relative to the traction vehicle. A "floating" cutting unit can follow the contours or undulations of the ground irrespective of the gross motion of the traction vehicle. The cutting units are normally supported by ground following devices, e.g., casters, skids or rollers, and the lift arm/traction vehicle joint and lift arm/deck joint preferably allow the decks to follow the intermediate ground countour. If cutting units are not supported in a floating manner, they tend to scalp the higher regions and miss the lower regions. While non-floating cutting units might be acceptable for residential use, certainly golf course and estate maintenance require that the cutting units individually follow the subtle variations of the ground to maintain a consistently good cut across the entire swath, regardless of the immediate topography encountered by each individual cutting unit.

To provide adequate traction, the traction vehicle itself should bear most of the weight of the mowing machine. On the other hand, to provide a consistent height of cut, irrespective of ground undulations, the cutting units should be self supporting to some degree to allow their ground contacting devices to continuously contact the ground.

Given these two somewhat inconsistent requirements, i.e., traction and ground hugging capability, it has long been understood that it is desirable to provide a degree of partial counterbalancing of cutting units in their working positions. That is, prior art cutting units have been supported such that a portion of their weight is borne by the traction vehicle. For example, reference is made to U.S. Pat. No. 4,307,559.

Traction is obviously most important on hills, whether uphill, sidehill or downhill. Operator safety is at stake, and wheel slippage can also force the operator to stop and start repeatedly. Further, wheel slippage also causes undesirable damage to the turf. In fact, hill traction is so important Applicants have discovered that most operators are willing to sacrifice some height of cut control to enhance hill traction. On level ground, traction is less important and it is therefore possible to allow the cutting units to be more self supporting to maximize their ground hugging capability. Therefore, Applicants perceive that it is desirable to have a first traction vehicle/cutting unit weight distribution on level ground (where relatively less weight on the traction wheels is necessary), and a second traction vehicle/cutting unit weight distribution on hills, where there is a need for a greater amount of weight on the traction wheels (where relatively more weight on the traction wheels is necessary). The horsepower required to propel a mowing machine uphill is most dependent upon the gross vehicle weight and is not primarily related to the weight carried by the drive tires. Therefore, traction can be improved by transferring some of the weight from the cutting units to the traction vehicle, without creating a greater load on the prime mover. Another advantage associated with transferring weight from the cutting units to the traction vehicle is an increase durability of the ground following devices, e.g., rollers, casters, or skids, which support the cutting units.

As noted above, the desirability of providing a degree of cutting unit counterbalance has long been recognized. It has also been recognized that it is desirable to provide an adjustable cutting unit counterbalance, so that more or less weight can be transferred to the traction vehicle drive wheels depending on conditions. Reference is made to the Groundsmaster ® 220 unit, manufactured by The Toro Company, assignee herein, which includes springs adjustably supporting the lift arms of a mower. While springs are somewhat useful for deck counterbalancing because of their simplicity and cost effectiveness, they are large and cumbersome and tend to vibrate in the absence of extensive damping. Counterbalancing springs are not easily adjusted, particularly during mowing operations; are liable to fatigue failure; and of course a separate mechanism, typically a hydraulic mechanism, must be included to raise and lower the cutting unit. Also, the springs cannot be easily adjusted to provide variable counterbalancing depending on conditions.

Hydraulic counterbalancing has been suggested as a means for overcoming the disadvantages of a spring system. In such systems hydraulics are used to raise and lower the cutting units, and also to provide partial counterbalancing. For example, an adjustable hydraulic system such as the one shown in FIG. 1 has been made available. Referring to FIG. 1, the prior art system broadly includes a pump; a single-acting cylinder or ram; a multi-position selector valve system; and a manually-operated proportional valve. The hydraulic ram used to raise and lower the deck is also used to counterbalance the deck in its lower, or working, position. The multiple-position selector valve system is included to allow the operator to raise, lower, lock or float the deck, by appropriately controlling the flow of hydraulic fluid to and from the ram. The manually-operated proportional valve controls the pressure in the return line when the deck is being floated, and therefore establishes the hydraulic "back pressure" within the cylinder which determines to what degree the deck is floated. The operator can adjust the "float" valve as the mower is operating to gradually dial in a greater floating pressure (less weight on the cutting unit, more weight on the traction unit drive wheels) or a lesser floating pressure (more weight on the cutting unit, less weight on the traction unit drive wheels) depending on conditions. It should particularly be noted that the prior art system shown in FIG. 1 includes only a simple single-acting cylinder.

While the general concept is laudable, there are several problems associated with the prior art adjustable hydraulic counterbalance system shown in FIG. 1. One serious drawback is that the system is too slow. Upon encountering different conditions, e.g., wet grass or hills, the operator must crank the valve one way or the other. He may not be able to properly adjust the proportional valve in time to prevent wheel slippage. And, as noted above, once traction is lost, it is very difficult to reestablish. Another problem associated with the prior art system shown in FIG. 1 is that it is imprecise. The operator gradually adjusts the valve until the mower "feels right." While this reliance on feel is acceptable for experienced operators it is simply unworkable for those will less experience. Only a highly skilled operator can ever know when the proportional valve is in the proper position to provide the proper weight distribution. Still another problem is that the proportional valve system is too burdensome. Many operators will simply not use a counterbalancing system that requires them to continually adjust a valve depending on the terrain and wetness. Given the problems associated with the proportional valve system shown in FIG. 1, operators naturally tend to select a compromise position somewhere in between maximum and minimum traction, rather than continually adjusting the valve in a futile chase of the optimal weight distribution. Relying on the operator to manipulate a manually operated proportional valve can be problematical. An operator, if given a choice, would normally set the system on the highest weight transfer setting to eliminate tire slippage in nearly every situation, but this would result in poor ground following.

The present invention addresses the problems associated with prior art cutting unit counterbalancing systems. In particular, the present invention includes a condition accommodating hydraulic counterbalance system which is fast, precise, and very easy to use. A preferred counterbalance or weight distribution state between the traction vehicle and the cutting unit(s) can thereby be established on hilly or level ground, and traction and contour following can be optimized.

SUMMARY OF THE INVENTION

Accordingly, the present invention broadly includes a counterbalance system for adjusting the weight distribution between a working unit and a traction unit. The invention includes means operatively connected to the traction unit for supporting the working unit comprising a variable force producing element, e.g., hydraulic cylinder; a control system for adjusting the amount of force provided by the force producing element; and an actuation system in operative contact with the control system, wherein the actuation system automatically acts on the control system to vary the force provided by the force producing element depending on predetermined conditions, whereby the weight distribution between the working unit and the traction unit is adjusted accordingly.

In a preferred embodiment, the variable force producing element is a hydraulic cylinder and the control system is a back pressure producing system which controls the amount of pressure in the return line from the hydraulic cylinder. In this case, the actuation system comprises devices or systems suitable for changing the back pressure provided by the back pressure system to adjust the force produced by the hydraulic cylinder.

In a still more preferred embodiment, the back pressure producing system provides two back pressures which can be automatically or manually selected by the actuation system. The lower back pressure provides less counterbalancing of the working unit, whereas more back pressure provides more counterbalancing of the working unit.

The working unit can be the cutting unit of a turf mower. An example of a cutting unit suitable for use with the system is a rotary deck.

Additional features and aspects of the invention are described in detail below with reference to the Drawings.

BRIEF DESCRIPTION OF THE DRAWINGS

The invention is further discussed with reference to the Drawings, wherein.

DETAILED DESCRIPTION OF THE INVENTION

Figure 2:
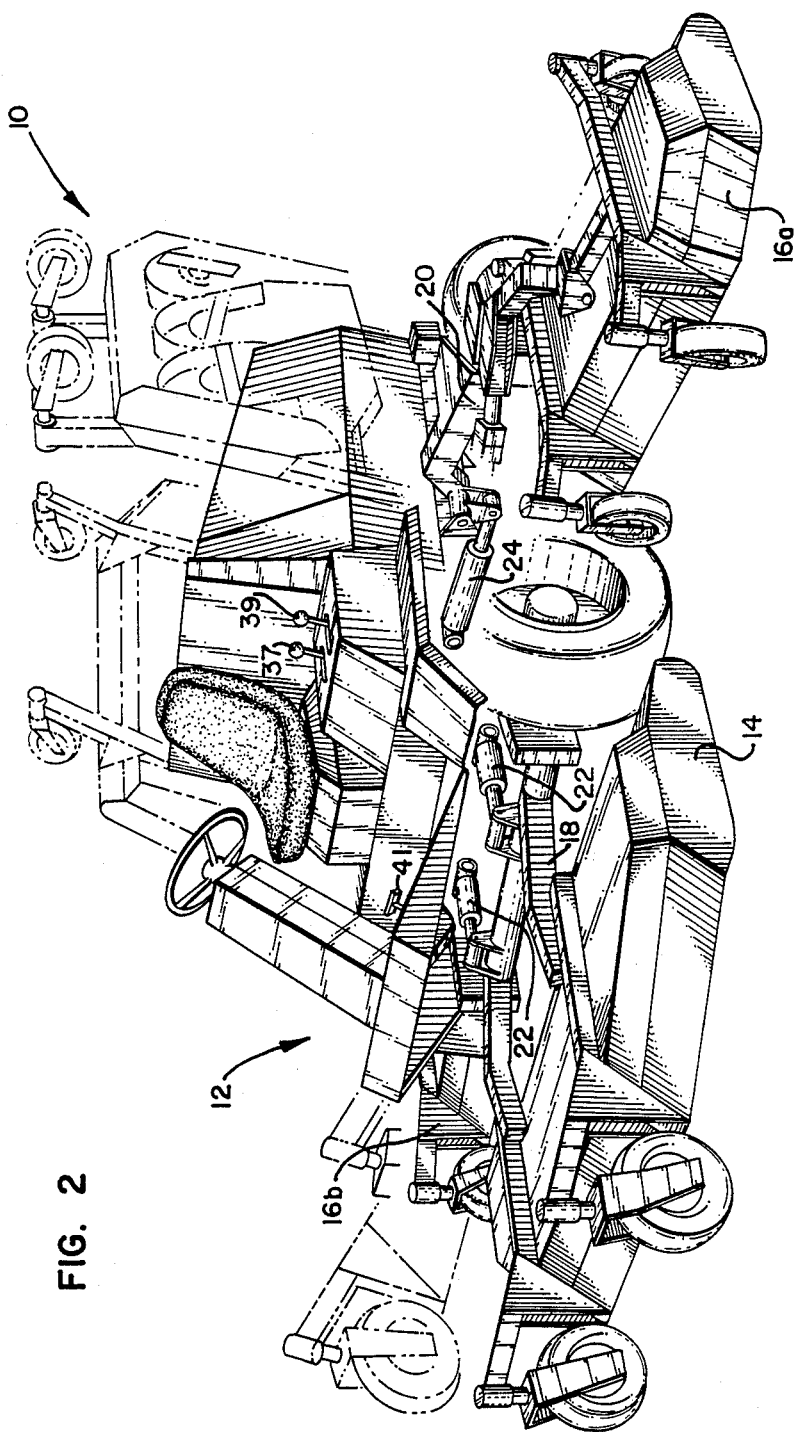
FIG. 2 is a perspective view of a mowing machine of the present invention including hydraulically counterbalanced rotary decks.

With reference to the Drawings, wherein like reference numerals designate like parts and assemblies throughout the several views, FIG. 2 shows a perspective view of a preferred rotary mower 10 according to the invention. Mower 10 is preferably a rear steer, front drive unit; traction enhancement by partial cutting unit counterbalancing is particularly useful on rear steer out front drive type units as any weight which can be transferred off of the cutting unit(s) is effectively carried by the drive tires. Mower 10 includes a traction vehicle 12 supporting a front rotary deck 14 and a pair of lateral wing decks 16a and 16b. Although wing decks 16a and 16b are identical, only wing deck 16a and its supporting structure are shown in any detail. Therefore, while only wing deck 16a and attendant parts are described, it will be understood that deck 16b is similarly if not identically constructed and supported.

Front deck 14 is supported by a lift arm 18 which is pivotally attached to the front of traction vehicle 12; and wing decks 16a and 16b are each supported by a lift arm 20. Each deck 14, 16 has an operating position, shown in solid line, and a transport position, shown in phantom. When decks 14, 16 are in their working or operating positions, they are counterbalanced such that they are self supporting to a degree, with the residual weight being carried by traction vehicle 12. To provide hydraulic counterbalancing and motive power for raising the front deck 14, there is a pair of single-acting cylinders 22 connected at one end to traction vehicle 12 and at the opposite end to front lift arm 18. Similarly, each wing deck lift arm 20 is acted upon by a double-acting cylinder 24. As the present invention primarily pertains to raising, lowering and floating working units using hydraulics, the remainder of the detailed description will focus on a hydraulic circuit 30 which includes cylinders 22 and 24.

Hydraulic Circuit 30

Figure 1:
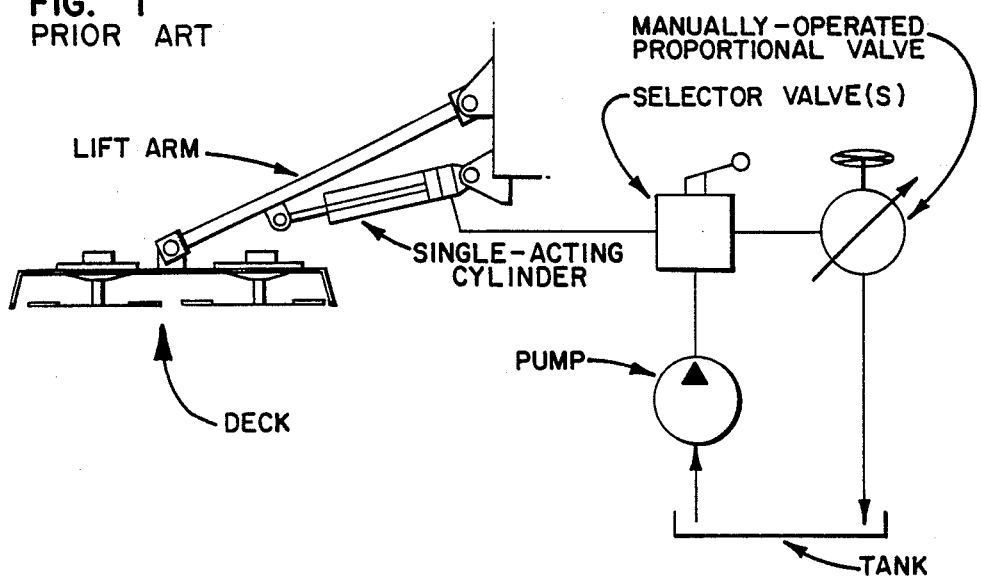
FIG. 1 is a diagrammatic view of a prior art deck counterbalance system.
Figure 3:
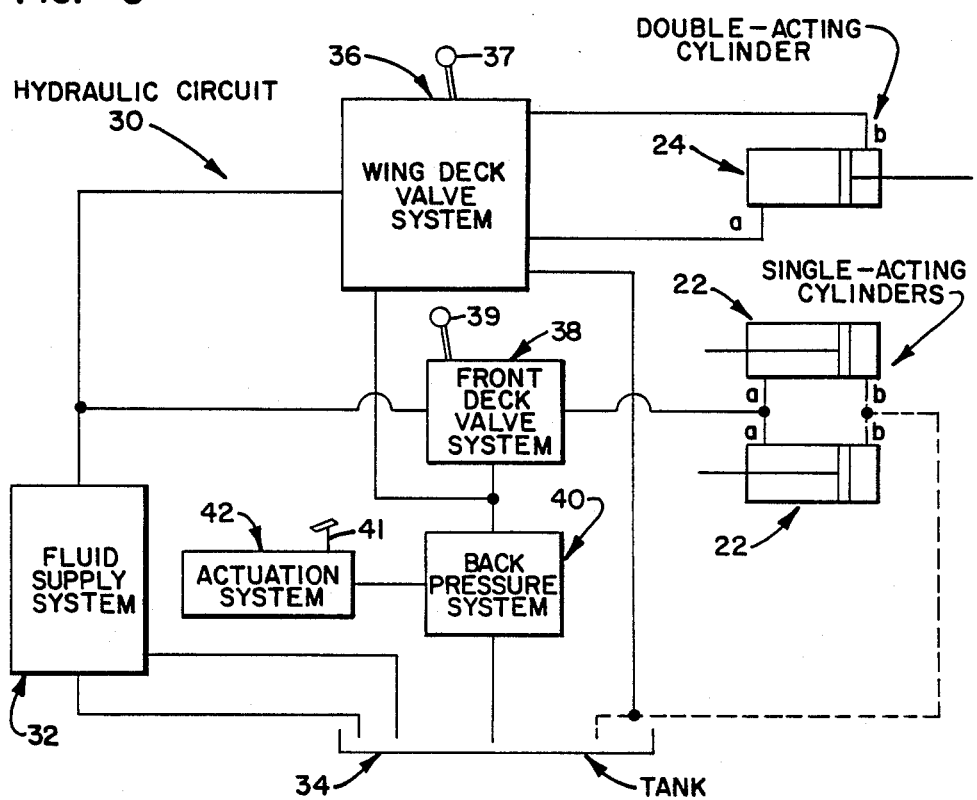
FIG. 3 is a functional block diagram of a preferred hydraulic circuit for the rotary mower shown in FIG. 2.

A general schematic of preferred hydraulic circuit 30 for supporting decks 14, 16 is shown in FIG. 3. In the broadest sense, hydraulic circuit 30 includes analogous systems to the prior art system shown in FIG. 1. That is, hydraulic circuit 30 includes hydraulic cylinders; a fluid supply system (including a pump); a selector valve system (including wing deck and front deck valve systems); and a back pressure system somewhat analogous to the manually-operated proportional valve shown in FIG. 1. However, in at least two major respects, hydraulic circuit 30 is significantly different from the prior art circuit: hydraulic circuit 30 can operate double-acting deck lift cylinders and it provides a back pressure system which is superior to the manually-operated proportional valve of the FIG. 1 circuit.

Further with reference to FIG. 3, hydraulic circuit 30 includes double-acting cylinder 24 and single-acting cylinders 22. It should be noted that for the sake of brevity only one double-acting wing deck cylinder 24 is shown. As further discussed below, additional lift cylinders can easily be added to this system, assuming that the pump and associated components are capable. Circuit 30 also includes a fluid supply system 32 which draws fluid from a tank 34 and provides it at adequate pressure and flow rate to the remaining components of hydraulic circuit 30. The outlet port of fluid supply system 32 is connected to a wing deck valve system 36 and a front deck valve system 38. Valve systems 36 and 38 are operated by levers 37 and 39, respectively, these levers being accessible to the operator during normal use of mower 10. Wing deck valve system 36 is connected to ports a and b of double-acting cylinder 24; tank 34; and the inlet port of a back pressure system 40. Likewise, front deck valve system 38 receives hydraulic fluid from the outlet of fluid supply system 32 and is also connected to inlet ports a of single-acting cylinders 22 and the inlet port of back pressure system 40. Back pressure system 40 dumps to tank 34 and is actuated by an actuation system 42 connected thereto. In this embodiment, actuation system 42 can be activated automatically or through the use of a foot pedal 41, shown in FIGS. 2 and 3. Broadly, circuit 30 functions as follows: by manipulation of levers 37 and 39, the operator controls the transfer of hydraulic fluid between valve systems 36, 38 and cylinders 24, 22, respectively, to raise, lower, lock or float the cylinders. It should be noted that each "system" of circuit 30 is generally outlined in dashed line in FIG. 4, but those skilled in the art will recognize that some components may actually serve multiple functions and that they can be interconnected in many ways to achieve substantially the same function.

Each of the "systems" mentioned above is described in some detail below. When the cylinders and decks are down and floating, back pressure system 40 provides one of two possible back pressures, depending on the status of actuation system 42. Preferably, actuation system 42 can manually (by foot pedal 41) or automatically act on back pressure system 40, but those skilled in the art will recognize that the circuit would still be useful and beneficial if only manual, or only automatic, actuation was provided. It should be noted that the deck lift geometry has been designed such that equal (or close to equal) pressures are required to lift each cutting unit so that one back pressure control provides equal amount of counterbalance to each unit.

Fluid Supply System 32

Figure 4:
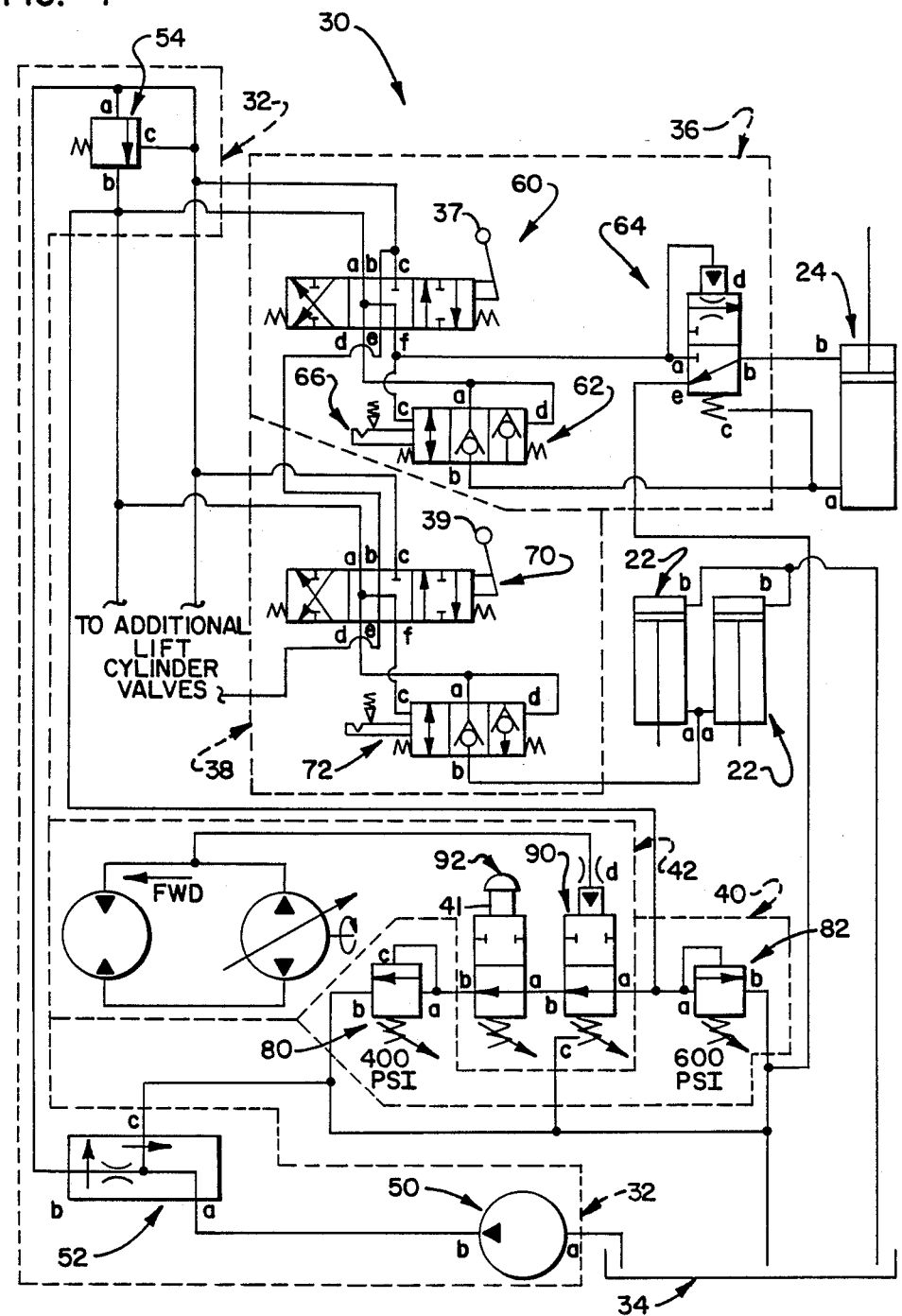
FIG. 4 is a detailed schematic diagram of a preferred hydraulic circuit for the rotary mower shown in FIG. 2.

Referring to FIG. 4, fluid supply system 32 preferably includes a pump 50; a flow proportioner 52; and a pressure relief valve 54. Pump 50 includes an inlet port a and an outlet port b. Inlet port a of pump 50 is connected to tank 34 whereas outlet port b of pump 50 is connected to inlet port a of flow proportioner 52. Pump 50 can conceivably by any type of hydraulic pump connected to a source of motive power, e.g., the prime mover of mower 10, but preferably pump 50 is a gear pump manufactured by Webster Hydraulics. Flow proportioner 52 is a three-port device having ports a, b and c, port a being the inlet port. Port b of flow proportioner 52 is the priority outlet port whereas port c is in communication with tank 34. Flow proportioner 52 functions to provide a predetermined flow rate out of its priority port b given at least that flow at its inlet port a. Any residual hydraulic fluid is dumped to tank through port c. Any of a large variety of flow proportioners will suffice. Priority port b of flow proportioner 52 is connected to port a of pressure relief valve 54 which is also a three-port device having ports a, b and c, wherein port a is the inlet port, port b the outlet port, and port c is the control port. Ports a and c are common, and pressure relief valve 54 is preferably set to 1500 PSI in this embodiment. Thus, if the pressure at ports a and c exceeds 1500 PSI the spool or slide within pressure relief valve 54 will move to relieve the pressure and to place ports a and b in communication. Port b of pressure relief valve 54 is connected to back pressure system 40 and also to valve systems 36 and 38 (referring to the broad schematic of FIG. 3). Pressure relief valve 54 can be of any standard type.

Wing Deck Valve System 36

Wing deck valve system 36 preferably includes a wing deck selector valve 60 having control lever 37; a wing deck detent sequence valve 60; and a "float" sequence valve 64. Valves 60, 62 and 64 are interconnected as shown to provide the preferred function.

Selector valve 60 is a three-way six port slide or spool valve, the position of which can be manually controlled by operation of lever 37. The valve includes ports a–f. The positions establish how the various ports are interconnected, these positions being "raise" (the leftmost position); "float/lock" (the middle position); and "lower" (the rightmost position). Valve 60 includes self-centering springs so that it is normally in the middle or float/lock position unless the operator manipulates lever 37 to hold the valve in either the raise or lower position. Valves of this type are readily available. For example, the Enbloc valve sold by Cessna could be used. Port a of selector valve 60 is connected to the inlet of back pressure system 40. Ports b and c of selector valve 60 are interconnected and are commonly tied to inlet a of pressure relief valve 54 and priority outlet port b of flow proportioner 52.

Also included in wing deck valve system 36 is wing deck detent sequence valve 62. This valve is basically a two-port (a and b) three-position spool or slide valve which is spring loaded toward the middle position and which includes a pair of control ports (c and d) on either end. Sequence valve 62 also includes a spring detent mechanism 66. The three positions of sequence valve 62 are "lock," which is the middle position of the valve; "raise," which is the right position of the valve; and "float," which is the left position of the valve. As explained further below, spring detent 66 acts to hold sequence valve 62 in the float state following a lowering of the deck, at least until the deck is once again raised; valve 62 is held in its float position until it is kicked back by a sufficient pressure at control port d. Port a of detent sequence valve 62 is connected to port d of wing deck selector valve 60; port b of sequence valve 62 is connected to port a of double-acting wing deck cylinder 24; control port c of sequence valve 62 is connected to port f of wing deck selector valve 60; and control port d of sequence valve 62 is in fluid communication with port a of same.

Wing deck detent sequence valve 62 is available from Cessna as part of the Enbloc directional control valve.

Finally, wing deck valve system 36 includes another sequence valve 64 which is herein termed a float sequence valve. Float sequence valve 64 is basically a three-port (a, b and e) two-position on/off valve having a pair of control ports (c and d) and being spring loaded toward one position, that position being shown in FIG. 4. Inlet port a of float sequence valve 64 is connected to port f of wing deck selector valve 60 and control port c of detent sequence valve 62. Port b of float sequence valve 64 is connected to port b of double-acting cylinder 24. Control port c which communicates with the same side of the spool or slide as the spring of sequence valve 64, is connected to port a of double-acting cylinder 24. Port e of valve 64 dumps to tank. Finally, control port d of sequence valve 64 is in fluid communication with port a of same.

Front Deck Valve System 38

Front deck valve system 38 is in many respects similar to wing deck valve system 36. The major difference between these two valve systems is that front deck valve system 38 does not include a valve like float sequence valve 64. This is because front deck valve system 38 operates in conjunction with one or more single-acting cylinders 22, whereas wing deck selector valve system 36 operates in conjunction with one or more double-acting cylinders 24. As further described below, float sequence valve 64 is needed because double-acting cylinders 24 are used to raise, lower, lock and float the wing decks 16 of mower 10.

Thus, front deck valve system 38 includes a front deck selector valve 70 substantially if not entirely identical to wing deck selector valve 60; and a front deck detent sequence valve 72 substantially if not entirely identical to wing deck detent sequence valve 62. That is, front deck selector valve 70 is a six-port three-position manually-operated slide or spool valve which is spring loaded so as to normally reside in the middle position as shown in FIG. 4. Lever 39 operates valve 70. The positions and ports of selector valve 70 are substantially identical to those of wing deck selector valve 60. However, ports b and c of front deck selector valve 70 are not interconnected as was the case for wing deck selector valve 60. Further, while port f of selector valve 60 is connected to control port a of front deck float sequence valve 64, valve 70 of course if not connected to a float sequence valve, as there is no such valve in the front deck valve system 38. Port b of detent sequence valve 72 is connected to ports a of single-acting cylinders 22. Ports a of selector valves 60 and 70 are interconnected. Similarly, ports c of selector valves 60 and 70 are also commonly connected to priority outlet b of flow proportioner 52. Port b of front deck selector valve 70 is connected to port e of wing deck selector valve 60.

Back Pressure System 40

Back pressure system 40 basically comprises a pair of pressure relief valves 80 and 82. Valve 80 is set to the lower pressure (for less float, decks more self supporting) and valve 82 is set to the higher pressure (for more float, decks less self supporting). The hydraulic fluid returning from cylinders 22, 24 normally courses through valve 80, unless actuation system 42 blocks hydraulic flow thereto. Valve 82 is automatically resorted to when flow is blocked to relief valve 80. The precise pressures that the back pressure relief valves 80, 82 are adjusted to provide depend on several factors, including the geometry of the lift system; the weight of the cutting units; and the type of units (rotary or reel). As is well known to those skilled in the art, reels are normally more self supporting so that they can better follow the contours of the ground and so that there are no reel-to-reel mismatch problems. Decks, on the other hand, can usually be floated to a greater degree, such that more weight is transferred to the traction vehicle. In one preferred embodiment, valve 80 is set to 400 PSI and valve 82 is set to 600 PSI, but again these pressures depend on the precise geometry of the lifting linkage, among other things. The "flat" setting (e.g., 400 PSI) would be based on optimum quality of cut whereas the "hill" setting (e.g., 600 PSI) would be based on maximum traction with some compromise of quality of cut. Relief valves 80 and 82 are essentially the same as pressure relief valve 54 in fluid supply system 32. They are basically two-port devices having an inlet port a and an outlet port b. Port a is connected to a control port c and the relief valve is spring loaded closed. When the pressure at ports a and c exceeds the preset relief pressure, the valve opens and hydraulic fluid is allowed to return to tank 34. Thus, the back pressure in the cylinder return circuit will either be 400 or 600 PSI, depending on which valve 80 or 82 is in play.

Actuation System 42

Actuation system 42 is connected to and acts on back pressure system 40. Actuation system 42 blocks the flow to lower pressure relief valve 80 in the event that additional traction is desired. A wide variety of devices or systems could be used in actuation system 42. One preferred actuation system is as shown in FIG. 4. This preferred system includes an automatic sequence valve 90 and a manual normally-open on/off valve 92 in line therewith. Sequence valve 90 is basically a two-port two-position valve having a pair of control ports. Valve 90 has an inlet port a, an outlet port b and a pair of control ports c and d. When the pressure at port d reaches a predetermined level, valve 90 closes, disconnecting ports a and b. Port d can be connected to the hydraulic circuit for the traction drive system, as shown in FIG. 4, for example. Alternatively, control port d could be eliminated and valve 90 could instead be controlled by a solenoid which is actuated by a switch controlled by the operator; or valve 90 could be actuated by steering/traction assist brakes; or switched by an inclinometer or mercury switch device which would work in conjunction with valve 90 to block the lower pressure relief valve 80 in the event that a hill is encountered by mower 10. Manual valve 92, operated by foot pedal 41, can be included so that the operator can transfer additional weight to traction vehicle 12 even when the automatic system, i.e., sequence valve 90, is not actuated. Those skilled in the art will recognize that a large variety of valves and valve actuation systems could be used for this application, including but not limited to those described above. In fact, valve 90 or valve 92 could be used alone. Also, valve 90 could be a proportional valve automatically adjusted depending on inclination, by, for example, the pressure in the traction drive circuit.

Operation

Cylinders 22 and 24 are shown in their raised positions in FIG. 4. When the cylinders are raised and when all of the valves of circuit 30 are as shown in FIG. 4, cylinders 22, 24 are locked and decks 14, 16 are in their raised or transport positions. Referring to double-acting wing deck cylinder 24, port b is in communication with tank 34 when float sequence valve 64 is in the position as shown in FIG. 4. Further, hydraulic fluid cannot flow out of cylinder 24 through port a because detent sequence valve 62 is positioned as shown in FIG. 4 such that a check valve prevents fluid from flowing from port b of sequence valve 62 to port a of same. Thus, cylinder 24 cannot move toward the "lower" position and deck 16 is locked in its raised position.

Similarly, front deck 14 is locked in its raised position because front deck detect sequence valve 72 is in its middle position preventing flow through the valve from port b to port a thereof.

It can therefore be seen that the middle position of valves 60, 70, 62 and 72 establish locked cylinders and decks.

When it is desirable to lower decks 14 and 16, levers 37, 39 of valves 60 and 70 are manipulated so that the right hand positions of the valves come into play. In the case of double-acting cylinder 24, this places ports c and f of selector valve 60 in communication and causes flow sequence valve 64 to assume its upper state since pressure at control port d kicks the valve down against spring pressure. Thus, hydraulic fluid can flow through selector valve 60 and float sequence valve 64 and into port b of double-acting cylinder 24. At the same time, pressure is applied to control port c of detent sequence valve 62 which causes sequence valve 62 to assume its left hand state wherein flow can course in either direction through the valve. Thus, excess hydraulic fluid on the "raise" (port a) side of cylinder 24 can flow through sequence valve 62 and selector valve 60 and eventually to the inlet port of back pressure system 40. Similarly, valves 70 and 72 assume their right and left hand states, respectively, to allow fluid to escape cylinders 22 through ports a thereof. The weight of deck 14 provides the impetus for this action.

When decks 14, 16 reach their lower extents, their working or operating positions, the operator releases selector valves 60 and 70, at which time they assume their middle positions as shown in FIG. 4. However, detent valves 62 and 72 do not return to their middle positions by virtue of the spring loaded detents which hold the valves in their left hand, "floating" positions. When the valve systems are in this state, decks 14 and 16 are in effect floating against the pressure created by back pressure system 40. In the case of wing deck 16, the "lower" (port b) side of cylinder 24 is connected directly to tank 34 through float sequence valve 64. The "raise" (port a) side of cylinder 24 is connected to the inlet of back pressure system 40. Similarly, in the case of front deck 14, ports a of cylinders 22 are connected to the inlet of back pressure system 40. Thus, hydraulic cylinders 22, 24 are counterbalanced with a predetermined back pressure on the "raise" (port a) sides of the cylinders and tank pressure on the "lower" (port b) sides of the cylinders.

The importance of valve 64, or a functional equivalent, is clear. Without valve 64, the pressure at ports a and b would be the same, and no counterbalancing would be provided to the double-acting cylinder. Valve 64 places port b of cylinder 24 at tank pressure so that roughly a 400 or 600 PSI differential can be established across the piston. It should be noted that the control spring of valve 64 can be selected or adjusted to provide a 50 PSI bias to valve 64 so that switching of the valve occurs only if the pressure at port d of the valve exceeds the pressure at port a of cylinder 24 by more than 50 PSI.

The magnitude of the back pressure depends on whether actuation system 42 is "selecting" the higher of the two back pressures provided by back pressure system 40. That is, in the embodiment shown in FIG. 4, the back pressure will be 400 PSI unless valve 90 or valve 92 is closed. If either valve 90 or valve 92 is closed, relief valve 82 must necessarily come into play and the back pressure will be 600 PSI. Automatic back pressure sequence valve 90 is closed when its control port d experiences a sufficiently large pressure. The inlet to sequence valve d, as noted above, is connected to the hydrostatic traction drive circuit, so that when the pressure in the traction drive circuit exceeds a certain predetermined level, valve 90 closes and 600 PSI back pressure is provided to float decks 14 and 16. Of course, the pressure in the traction drive circuit will climb whenever mower 10 ascends a hill, the time when greater traction is most needed. While the traction circuit pressure at which switching occurs will vary depending on the traction drive itself, among other factors, Applicants have chosen a 2000 PSI switching pressure for the system shown in FIG. 4.

The preferred actuation system 42 shown in FIG. 4 also includes manual valve 92 which can be closed by pushing foot pedal 41 to preclude flow through 400 PSI back pressure valve 80. Valve 92 can be used, for example, when approaching a wet hill so as to eliminate even the possibility of slipping prior to a sufficient increase in the traction drive hydrostatic pressure.

To raise decks 14, 16, levers 37, 39 are manipulated to place valves 60, 70, respectively, in their leftmost positions. When the valves are so positioned, detent valves 62, 72 are kicked over to their rightmost positions, overriding the detent, by virtue of pressure at their respective control ports d. Hydraulic fluid can then pass through valves 60, 70 (ports c to ports d); valves 62, 72 (ports a to ports b); and into cylinders 24, 22 (ports a). Ports b of cylinders 24, 22 are in fluid communication with tank 34. Valve 64 is in the position shown in FIG. 4 because the pressure at control port d is only 400 or 600 PSI, because of the interconnection between ports a and f of valve 60.

There are other modifications which will be apparent to those skilled in the art. Accordingly, the scope of this invention will be limited only by the appended claims.

We claim:

1. A counterbalance system for adjusting the weight distribution between a working unit and a traction vehicle, comprising:
   (a) means operatively connected to the traction vehicle for supporting the working unit comprising a variable force producing element;
   (b) a control system in operative contact with the force producing element for adjusting the amount of force produced by the force producing element; and
   (c) an actuation system in operative contact with the control system, wherein the actuation system automatically acts on the control system to vary the force provided by the force producing element depending on predetermined conditions, whereby the weight distribution between the working unit and the traction vehicle is adjusted accordingly.

2. A counterbalance system for adjusting the weight distribution between a working unit and a traction vehicle, comprising:
   (a) means comprising a variable force producing system operatively connected to the traction vehicle for partially supporting the working unit, thereby establishing the weight distribution between the traction vehicle and the working unit; and
   (b) a control system in operative contact with the force producing system comprising means for automatically adjusting the amount of force produced by the force producing system depending on predetermined conditions, whereby the weight distribution between the working unit and the traction vehicle is adjusted accordingly.

3. The counterbalance system of claim 2, wherein the variable force producing system comprises a hydraulic cylinder.

4. The counterbalance system of claim 3, wherein the hydraulic cylinder is a double-acting cylinder.

5. The counterbalance system of claim 3, wherein the variable force producing system further comprises a back pressure system operatively connected to the hydraulic cylinder, wherein the back pressure system is connected to and acted upon by the control system, whereby the back pressure applied to the cylinder is changed to automatically adjust the weight distribution between the traction vehicle and the working unit.

6. The counterbalance system of claim 5, wherein the back pressure is automatically adjusted between two points, a lower back pressure wherein the working unit is more self supporting and a higher back pressure wherein more of the working unit weight is transferred to the traction vehicle.

7. The counterbalance system of claim 6, wherein:
   (a) the back pressure system comprises first and second relief valves, the first relief valve being set at the lower back pressure and the second relief valve being set at the higher back pressure; and
   (b) the control system comprises a first on/off valve operatively connected between the cylinder and the first relief valve, wherein when the first on/off valve is open the lower back pressure is applied by the first relief valve, and when the first on/off valve is closed the higher back pressure is applied by the second relief valve.

8. The counterbalance system of claim 7, wherein the traction vehicle comprises a hydraulic traction drive system having a traction drive pressure; and the first on/off valve is operatively coupled to the traction drive system and subject to the traction drive pressure, wherein when the traction drive pressure is below a predetermined point the first on/off valve is open and the first relief valve is in fluid communication with the cylinder, and when the traction drive pressure is at or above the predetermined point the first on/off valve is closed and only the second relief valve is in fluid communication with the cylinder.

9. The counterbalance system of claim 2, wherein the control system further comprises means for manually adjusting the amount of force provided by the force producing system.

10. The counterbalance system of claim 7, wherein the control system further comprises means for manually adjusting the amount of force provided by the force producing system, and the manual adjustment means comprises a manually-operative second on/off valve in fluid communication with the first relief valve, wherein the first relief valve is in fluid communication with the cylinder when the first and second on/off valves are open, but the first relief valve is not in fluid communication with the cylinder when either the first or second on/off valve is closed, whereby the higher back pressure is applied to the cylinder either through the automatic actuation of the first on/off valve or the manual actuation of the second on/off valve, or both.

11. The counterbalance system of claim 10, wherein the traction vehicle comprises a hydraulic traction drive system having a traction drive pressure; and the first on/off valve is operatively coupled to the traction drive system and subject to the traction drive pressure, wherein when the traction drive pressure is below a predetermined point the first on/off valve is open and the first relief valve is in fluid communication with the cylinder, and when the traction drive pressure is at or above the predetermined point the first on/off valve is closed and only the second relief valve is in fluid communication with the cylinder.

12. The counterbalance system of claim 5, wherein the cylinder is a double-acting cylinder and the back pressure is applied to a first side of the cylinder; and the back pressure system further comprises a sequence valve which places tank pressure on a second side of the cylinder when it is desirable to partially counterbalance the working unit, whereby the difference between the back pressure and the tank pressure cause a portion of the working unit weight to transfer to the traction vehicle.

13. A mower comprising:
(a) a traction vehicle;
(b) a cutting unit pivotally attached to the traction vehicle; and
(c) a counterbalance system for adjusting the weight distribution between the cutting unit and the traction vehicle, comprising:
  (i) means comprising a variable force producing system operatively connected to the traction vehicle for partially supporting the cutting unit, thereby establishing the weight distribution between the traction vehicle and the cutting unit; and
  (ii) a control system in operative contact with the force producing system comprising means for automatically adjusting the amount of force produced by the force producing system depending on predetermined conditions, whereby the weight distribution between the cutting unit and the traction vehicle is adjusted accordingly.

14. The mower of claim 13, wherein the variable force producing system comprises a hydraulic cylinder.

15. The mower of claim 14, wherein the hydraulic cylinder is a double-acting cylinder.

16. The mower of claim 14, wherein the variable force producing system further comprises a back pressure system operatively connected to the hydraulic cylinder, wherein the back pressure system is connected to and acted upon by the control system, whereby the back pressure applied to the cylinder is changed to automatically adjust the weight distribution between the traction vehicle and the working unit.

17. The mower of claim 16, wherein the back pressure is automatically adjusted between two points, a lower back pressure wherein the working unit is more self supporting and a higher back pressure wherein more of the working unit weight is transferred to the traction vehicle.

18. The mower of claim 17, wherein:
(a) the back pressure system comprises first and second relief valves, the first relief valve being set at the lower back pressure and the second relief valve being set at the higher back pressure; and
(b) the control system comprises a first on/off valve operatively connected between the cylinder and the first relief valve, wherein when the first on/off valve is open the lower back pressure is applied by the first relief valve, and when the first on/off valve is closed the higher back pressure is applied by the second relief valve.

19. The mower of claim 18, wherein the traction vehicle comprises a hydraulic traction drive system having a traction drive pressure; and the first on/off valve is operatively coupled to the traction drive system and subject to the traction drive pressure, wherein when the traction drive pressure is below a predetermined point the first on/off valve is open and the first relief valve is in fluid communication with the cylinder, and when the traction drive pressure is at or above the predetermined point the first on/off valve is closed and only the second relief valve is in fluid communication with the cylinder.

20. The mower of claim 13, wherein the control system further comprises means for manually adjusting the amount of force provided by the force producing system.

21. The mower of claim 18, wherein the control system further comprises means for manually adjusting the amount of force provided by the force producing system, and the manual adjustment means comprises a manually-operated second on/off valve in fluid communication with the first relief valve, wherein the first relief valve is in fluid communication with the cylinder when the first and second on/off valves are open, but the first relief valve is not in fluid communication with the cylinder when either the first or second on/off valve is closed, whereby the higher back pressure is applied to the cylinder either through the automatic actuation of the first on/off valve or the manual actuation of the second on/off valve, or both.

22. The mower of claim 21, wherein the traction vehicle comprises a hydraulic traction drive system having a traction drive pressure; and the first on/off valve is operatively coupled to the traction drive system and subject to the traction drive pressure, wherein when the traction drive pressure is below a predetermined point the first on/off valve is open and the first relief valve is in fluid communication with the cylinder, and when the traction drive pressure is at or above the predetermined point the first on/off valve is closed and only the second relief valve is in fluid communication with the cylinder.

23. The mower of claim 16, wherein the cylinder is a double-acting cylinder and the back pressure is applied to a first side of the cylinder; and the back pressure system further comprises a sequence valve which places tank pressure on a second side of the cylinder when it is desirable to partially counterbalance the working unit, whereby the difference between the back pressure and the tank pressure cause a portion of the working unit weight to transfer to the traction vehicle.

24. A mower comprising:
(A) a traction vehicle comprising a hydraulic traction drive system having a traction drive pressure;
(B) a cutting unit;
(C) a lift arm assembly pivotally extending between the traction vehicle and the cutting unit; and
(D) a counterbalance system for acting on the lift arm assembly to adjust the weight distribution between the cutting unit and the traction vehicle, comprising:
  (1) a double-acting cylinder operatively connected to the traction vehicle and the lift arm assembly, the cylinder having first and second sides;
  (2) first and second relief valves, the first relief valve being set at a lower back pressure and the second relief valve being set at a higher back pressure, wherein the second relief valve is continuously in fluid communication with the first side of the double-acting cylinder, and the first relief valve is in selective fluid communication with the first side of the double-acting cylinder;
  (3) first and second on/off valves operatively connected in series between the first side of the double-acting cylinder and the first relief valve, wherein:
    (a) the first on/off valve is operatively coupled to the traction drive system and subject to the traction drive pressure, wherein when the traction drive pressure is below a predetermined point the first on/off valve is open, and when the traction drive pressure is at or above the predetermined point the first on/off valve is closed and only the second relief valve is in fluid communication with the cylinder; and (b) the second on/off valve can be manually operated to remove the first relief valve from fluid communication with the double-acting cylinder, whereby when the first and second on/off valves are open the lower back pressure is applied by the first relief valve, and when either the first or second on/off valve is closed the higher back pressure is applied by the second relief valve; and (4) a sequence valve operatively connected to the second side of the double-acting cylinder suitable for placing tank pressure on the second side of the cylinder when it is desirable to partially counterbalance the cutting unit, whereby the difference between the back pressure provided by the first or second relief valve and the tank pressure causes the double-acting cylinder to act on the lift arm assembly so that a portion of the cutting unit weight transfers to the traction vehicle.

* * * * *